(12) United States Patent
Genc et al.

(10) Patent No.: US 7,215,322 B2
(45) Date of Patent: *May 8, 2007

(54) INPUT DEVICES FOR AUGMENTED REALITY APPLICATIONS

(75) Inventors: Yakup Genc, Plainsboro, NJ (US);
Nassir Navab, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 198 days.

This patent is subject to a terminal disclaimer.

(21) Appl. No.: 10/153,520

(22) Filed: May 22, 2002

(65) Prior Publication Data

US 2004/0113885 A1 Jun. 17, 2004

Related U.S. Application Data

(60) Provisional application No. 60/294,850, filed on May 31, 2001.

(51) Int. Cl.
*G09G 5/00* (2006.01)
(52) U.S. Cl. ............................ 345/157; 345/7; 382/103
(58) Field of Classification Search ................ 345/7–9, 345/632, 633, 156–158; 348/169, 137, 164; 382/154, 103; 178/18.01, 18.03, 18.09
See application file for complete search history.

(56) References Cited

U.S. PATENT DOCUMENTS 5,591,972 A * 1/1997 Noble et al. ................. 250/330
5,856,844 A * 1/1999 Batterman et al. ...... 348/207.99
5,933,125 A * 8/1999 Fernie et al. ................... 345/8
6,157,368 A * 12/2000 Fager .......................... 345/156
6,353,428 B1 * 3/2002 Maggioni et al. ........... 345/157
6,625,299 B1 * 9/2003 Meisner et al. .............. 382/103
6,630,915 B1 * 10/2003 Flood ............................. 345/8
6,787,750 B1 * 9/2004 Sauer ....................... 250/208.1
7,064,742 B2 * 6/2006 Navab et al. ................ 345/156
2002/0082498 A1 * 6/2002 Wendt et al. ................ 600/411
2002/0107674 A1 * 8/2002 Bascle et al. .................. 703/1
2002/0196343 A1 * 12/2002 Navab et al. ................ 348/169
2003/0227470 A1 * 12/2003 Genc et al. .................. 345/633

* cited by examiner

*Primary Examiner*—Lun-Yi Lao
(74) *Attorney, Agent, or Firm*—Donald B. Paschburg; F. Chau & Associates, LLC

(57) ABSTRACT

A new interaction/input device for an augmented reality system is provided. In an augmented reality system using infrared video-based tracking, the interaction/input device is employed by placing markers, e.g., small disks, at a predetermined location in a scene viewed by a user which are augmented to simulate physical buttons. These augmented markers, as viewed through the augmented reality system, can then be physically manipulated by the user. The user will put their fingers on one of these markers, and in turn, the infrared video-based tracker will recognize this action and process it accordingly. The augmented reality system can also augment simulated menus in the user's view giving the user the necessary feedback for interaction. By exploiting conventional tracking technology, the interaction/input device can be implemented with minimal additional hardware and minimal additional processing required by the augmented reality system.

20 Claims, 3 Drawing Sheets

INPUT DEVICES FOR AUGMENTED REALITY APPLICATIONS

PRIORITY

This application claims priority to an application entitled "NEW INPUT DEVICES FOR AUGMENTED REALITY APPLICATIONS" filed in the United States Patent and Trademark Office on May 31, 2001 and assigned Ser. No. 60/294,850, the contents of which are hereby incorporated by reference.

BACKGROUND OF THE INVENTION

1. Field of the Invention

The present invention relates generally to augmented reality systems, and more particularly, to input devices and methods for user interaction with an augmented reality system.

2. Description of the Related Art

Augmented reality is the technology in which a user's view of the real world is enhanced with additional information generated from a computer model, i.e., the virtual. The enhancements may include labels, 3D rendered models, or shading and illumination changes. Augmented reality allows a user to work with and examine the physical world, while receiving additional information about the objects in it. Some target application areas of augmented reality include computer-aided surgery, repair and maintenance, facilities modification and interior design.

In a typical augmented reality system, the view of a real scene is augmented by superimposing computer-generated graphics on this view such that the generated graphics are properly aligned with real-world objects as needed by the application. The graphics are generated from geometric models of both virtual objects and real objects in the environment. In order for the graphics and the real-world objects to align properly, the pose (i.e., position and orientation) and optical properties of the user and virtual cameras must be the same. The position and orientation of the real and virtual objects in some world coordinate system must also be known. The locations of the geometric models and virtual cameras within the augmented environment may be modified by moving its real counterpart. This is accomplished by tracking the location of the real objects and using this information to update the corresponding transformations of the geometric models within the virtual world. This tracking capability may also be used to manipulate purely virtual objects, ones with no real counterpart, and to locate real objects in the environment. Once these capabilities have been brought together, real objects and computer-generated graphics may be blended together, thus augmenting a dynamic real scene with information stored and processed on a computer.

Recent advances in both hardware and software have made it possible to build augmented reality (AR) systems that can run on regular desktop computers with off-the-shelf display and imaging devices. For example, the ARBrowser™ system, developed at Siemens Corporate Research, runs on a 400 MHz Pentium III machine. The system uses infrared video-based tracking technology, also developed at Siemens Corporate Research. This tracking technology considerably reduces the time required for tracking and pose estimation while maintaining the robustness and accuracy of the pose estimation. These advances allow the AR system to run on a regular computer without specialized display hardware at full frame rate, currently 30 frames per second (fps).

As the above-described advances in tracking speed and accuracy helped realize real-time augmentation, user interaction issues have become more visible. To fully realize the potential of AR systems, users need to interact with the systems and conventional methods, such as a keyboard and mouse, have proved to be very cumbersome. More advanced methods of interaction, i.e., speech driven methods, are hard to integrate with AR systems due to their inherent difficulties, such as "training" the speech driven system, and their large processing power requirements, which will hinder the running of the AR system resulting in lower frame rates and additional delays. Most augmented reality systems, currently being used and developed, are lacking easy-to-use, intuitive and effective means of interaction with the user.

SUMMARY OF THE INVENTION

It is therefore an object of the present invention to provide an interaction/input device for an augmented reality (AR) system.

It is another object of the present invention to provide an input device and method for use for an augmented reality (AR) system which is easy-to-use and intuitive for a user, thus enhancing the experience of the user with the system.

It is a further object of the present invention to provide an interaction device which requires minimal additional hardware and minimal additional processing power.

To achieve the above and other objects, a new interaction/input device for an augmented reality system is provided. By exploiting conventional tracking technology, the interaction/input device can be implemented with minimal additional hardware and minimal additional processing required by the augmented reality system. In an augmented reality system using infrared video-based tracking, the interaction/input device is employed by placing markers, e.g., small disks, at a predetermined location in a scene viewed by a user which are augmented to simulate physical buttons. These augmented markers, as viewed through the augmented reality system, can then be physically manipulated by the user. The user will put their fingers on one of these markers or disks, and in turn, the infrared video-based tracker will recognize this action and process it accordingly. The augmented reality system can also augment simulated menus in the user's view giving the user the necessary feedback for interaction.

According one aspect of the present invention, a system for augmenting a user's view of real-world objects with virtual objects to provide a composite augmented reality image is provided. The system including a display device for displaying the composite augmented reality image to the user; a video-based tracking system for locating real-world objects; a processor for determining the position and orientation of the user's view based on the location of the real-world objects and for projecting the virtual objects onto the display device; and an input device including at least one marker placed at a predetermined location in the real world, wherein the tracking system locates the input device and the processor determines its functionality based on its location.

According to another aspect of the present invention, in a system for augmenting a user's view of real-world objects with virtual objects to provide a composite augmented reality image, the system including a display device for displaying the composite augmented reality image to the user, a video-based tracking system for locating real-world objects, and a processor for determining the position and orientation of the user's view based on the location of the real-world objects and for projecting the virtual objects onto the display device, an input device is provided including at least one marker placed at a predetermined location in the real world, wherein the tracking system locates the input device and the processor determines its functionality based on its location.

According to a further aspect of the present invention, in a system for augmenting a user's view of real-world objects with virtual objects to provide a composite augmented reality image, the system including a display device for displaying the composite augmented reality image to the user, a video-based tracking system for locating real-world objects, and a processor for determining the position and orientation of the user's view based on the location of the real-world objects and for projecting the virtual objects onto the display device, a method for interacting with the system is provided. The method includes the steps of providing an input device including at least one marker placed at a predetermined location in the real world; capturing video of the real world by the video-based tracking system; analyzing the captured video to determine if the at least one marker is visible; if the at least one marker is visible, determining the real world location of the at least one marker; and loading the input device's functionality into the system to be available for the user to interact with the system. The method further includes the steps of determining if the at least one marker is not visible after entering an input mode; and if the at least one marker is not visible, performing a function associated with the at least one marker.

BRIEF DESCRIPTION OF THE DRAWINGS

The above and other objects, features, and advantages of the present invention will become more apparent in light of the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail to avoid obscuring the invention in unnecessary detail.

Generally, an augmented reality system includes a display device for presenting a user with an image of the real world augmented with virtual objects, a tracking system for locating real-world objects, and a processor, e.g., a computer, for determining the user's point of view and for projecting the virtual objects onto the display device in proper reference to the user's point of view.

Figure 1A:
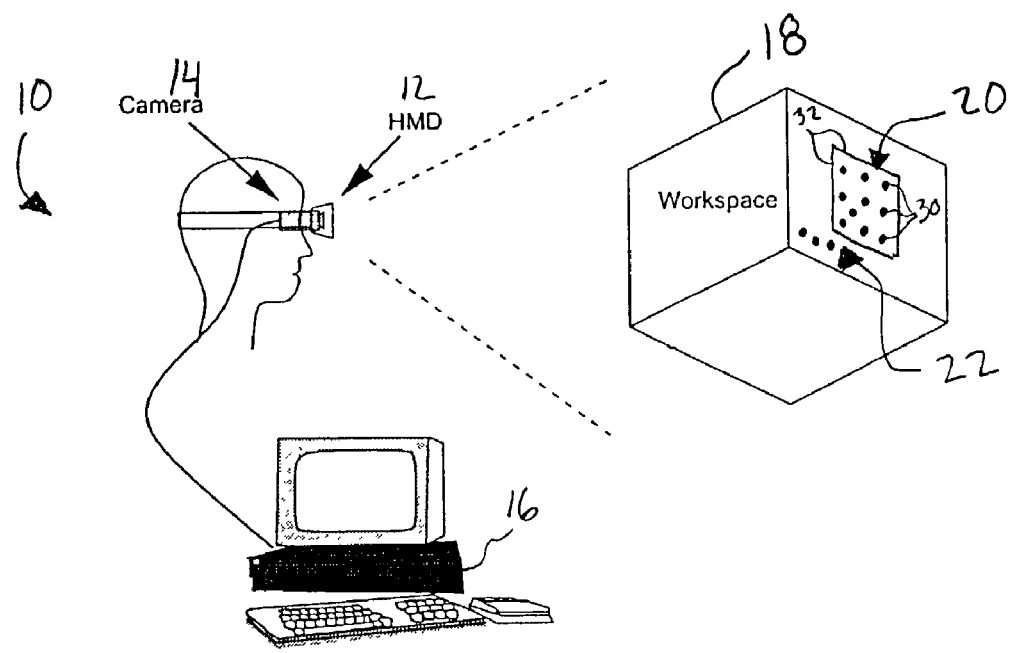
FIG. 1A is a schematic diagram illustrating an augmented reality system with infrared video-based tracking in accordance with the present invention.

Referring to FIG. 1A, an exemplary augmented reality (AR) system 10 to be used in conjunction with the present invention is illustrated. The AR system 10 includes a head-mounted display (HMD) 12, an infrared video-based tracking system 14 and a processor 16, here shown as a desktop computer. For the purposes of this illustration, the AR system 10 will be utilized in a specific workspace 18 which includes marker board 20 and an input device 22 of the present invention.

Figure 1B:
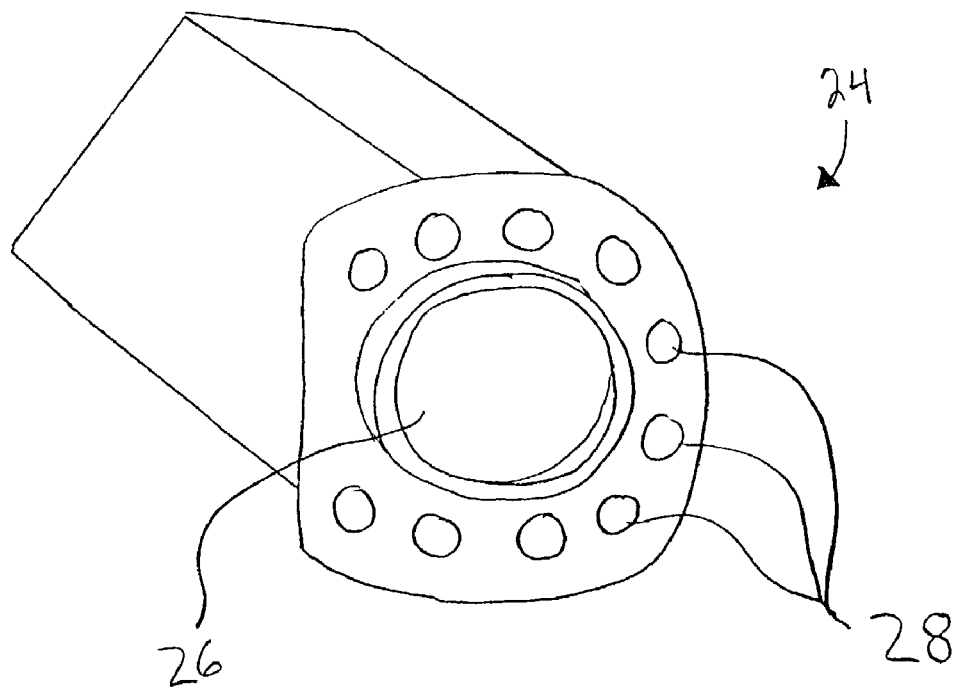
FIG. 1B is a perspective view of an infrared tracker camera with infrared illumination LEDs.

Referring to FIGS. 1A and 1B, the tracking system used in conjunction with marker board 20 determines the position and orientation of a user's head and subsequently a scene the user is viewing. Generally, the infrared video-based tracking system 14 includes a camera 24 with an infrared-filter lens 26 and a plurality of infrared illumination light-emitting diodes (LEDs) 28 mounted around the lens 24; a video capture board mounted in the processor 16; and a set of retroreflective markers, e.g., a circular disk or square tile. Video obtained from the camera 24 through the capture board is processed in the processor 16 to identify the images of the retroreflective markers. Because the video captured is filtered, the only visible items will be the ones corresponding to the retroreflective markers, i.e., items reflecting light in an infrared frequency. Since the location of the markers are known within a specific workspace, the processor can determine the pose of the user.

In the AR system of FIG. 1A, the marker board 20 is utilized for determining the pose of the user. The marker board 20 includes ten small retroreflective disks 30 surrounded by four thin retroreflective bands 32. The exact configuration and location of the marker board 20 is stored in the processor so when the camera 24 of the tracking system 14 encounters the marker board 20, the pose of the user can readily be determined. This pose estimation is used in turn for augmentation. The bands 32 surrounding the ten disks 30 robustify the tracking process and allow the addition of other retroreflective markers as input devices.

Once the marker board 20 is identified in the video as captured by camera 24, the position of the input device 22 can be estimated in the video. The input device 22 is determined based on its physical location in the real world in relation to the physical location of the marker board 20. Through the tracker and pose estimation as determined by the processor, the position of any world point in the user's view can be estimated. This means that the projection or position of the input device 22 in the user's view can be calculated, and thus, it can be determined if the input device is visible to the user. Once the input device becomes visible, the input device's functionality can be loaded and the AR system 10 can go into a menu/input mode and wait for the user's actions for some input events. The AR system 10 will determine if a user is interacting by determining if a marker of the input device 22 is visible or not. If the marker is not visible, e.g., by the action of the user covering the marker, the system will determine the marker is activated and perform an associated function.

It is to be understood the type and functionality of an input device of the present invention is determined by the processor based on the known specific locations of markers placed in the physical world in relation to the marker board. Therefore, once the position of the marker board 20 is estimated, any number of input devices can be realized by placing markers at known locations in relation to the marker board. For example, a single marker can be placed near the upper left hand corner of the marker board and can be augmented to represent an on/off button. Additionally, a 4×3 matrix of markers can be placed at a specific location in relation to the marker board to simulate a numerical keypad input device, like those used on a telephone. Furthermore, a combination of one or more input devices may be placed around the workspace at one time simulating different options to the users and making the AR system scalable.

Figure 2:
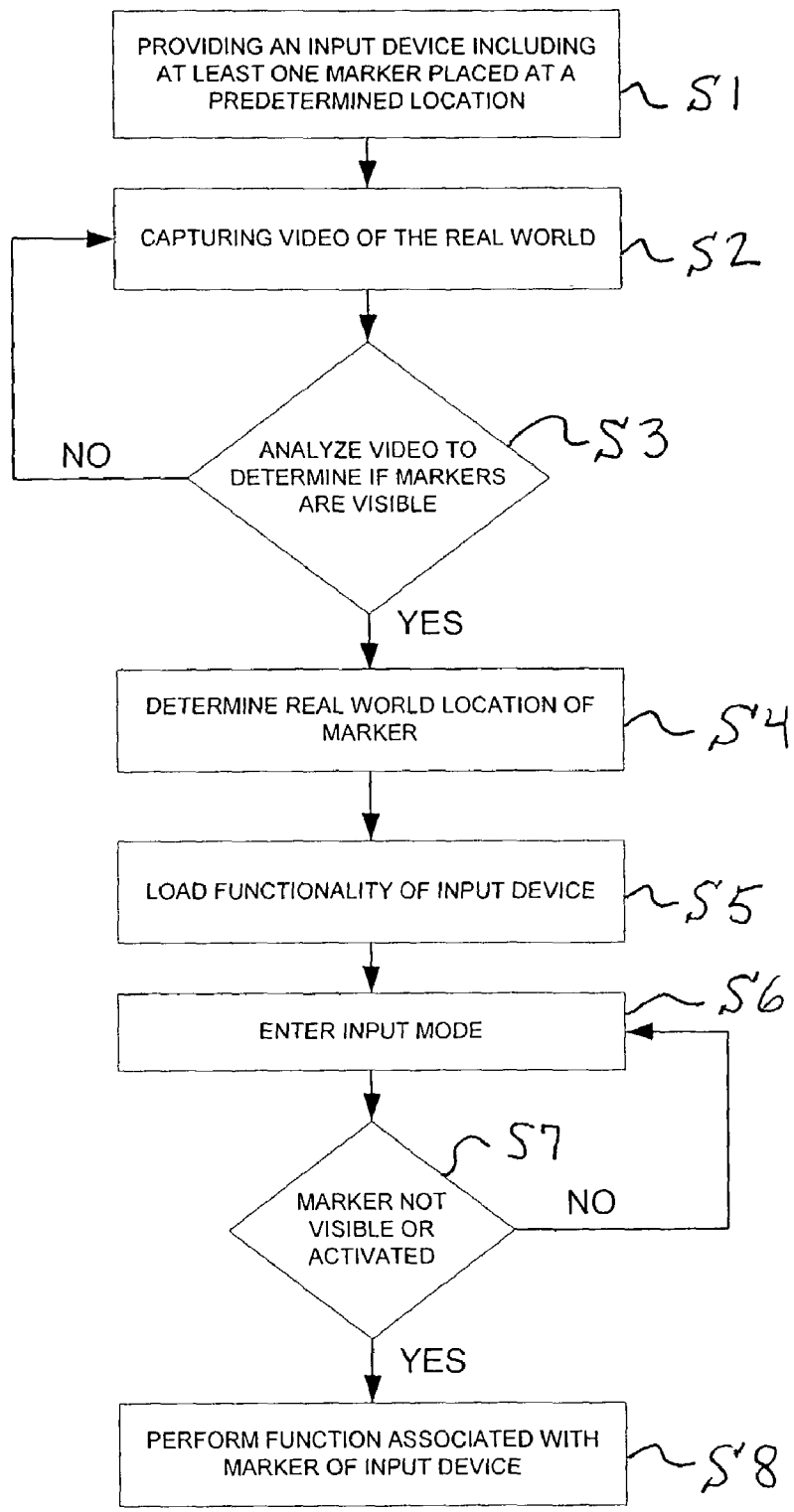
FIG. 2 is a flowchart illustrating a method of interacting with an augmented reality system employing an input device of the present invention.
Figure 3:
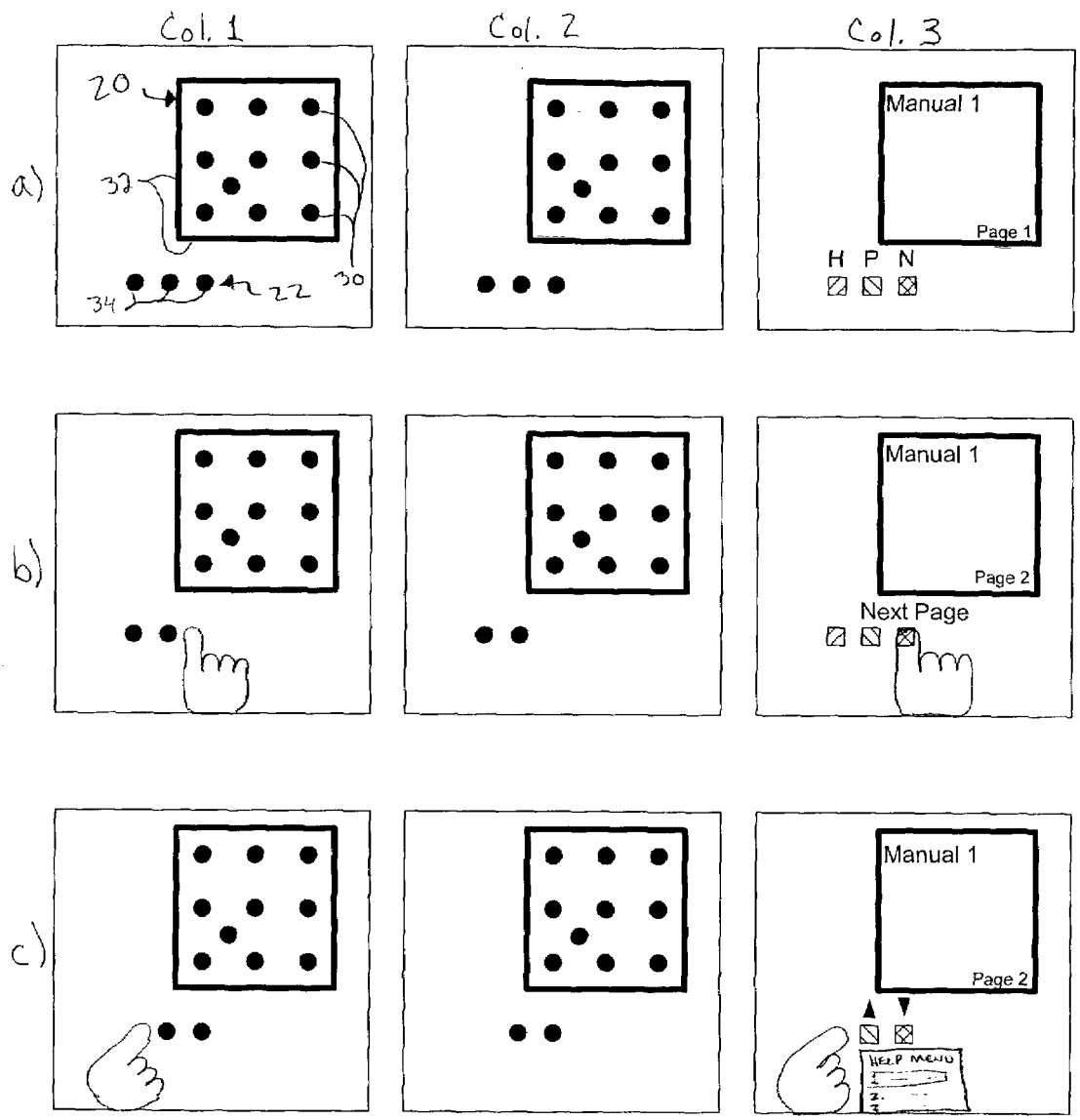
FIG. 3 illustrates several views of a user interacting with the augmented reality system in accordance with the present invention, where column 1 represents real-world views, column 2 represents views as seen from the infrared tracker camera and column 3 represents augmented views of a user.

An illustration of how a user interacts with an AR system employing an input device of the present invention will be described below in conjunction with FIGS. 2 and 3, where FIG. 2 is a flowchart illustrating a method of interacting with the augmented reality system employing an input device of the present invention and FIG. 3 illustrates several views of the user interacting with the augmented reality system in accordance with the present invention, where column 1 represents real world views, column 2 represents views as seen from the infrared tracker camera 24 and column 3 represents augmented views of the user and the rows of FIG. 3 represent different interactions of the user.

The first row in FIG. 3 shows the AR system entering a menu/input mode. The first view illustrates a real world view of the marker board 20 with input device 22 in close proximity at a specific, predetermined location in the real world (Step S1). The second view of the first row is a view of the marker board 20 and input device 22 captured through the infrared-filtered camera 24, wherein all retroreflective markers are visible (Step S2). Through the use of the tracking system and processor, the AR system is able to determine the three markers 34 of the input device are outside the four bands of the marker board 20 and thus is the input device 22 and it is in the user's view (Step S3). Once the pose of the user and input device is determined (Step S4), the AR system will augment the user's view as in the third view of the first row. Here, as in Step S5, the three markers 34 are augmented with computer-generated graphics to simulate buttons or menus, e.g., the first markers reads "H" for help, the second marker reads "P" for previous page, and the third marker reads "N" for next page, and thus, the AR system enters the menu/input mode (Step S6). Optionally, the AR system will overlay a graphic on the marker board 20, such as a manual to assist the user in performing an operation to a piece of equipment in the user's view.

The second row of FIG. 3 shows the user choosing an action, i.e., requesting the next page of the manual. The first view of the second row shows the user's finger covering the third marker of the input device 22. Camera 24 determines that the third marker is not visible, as shown in the second view of the second row and in Step S7, and the AR system realizes the user has prompted the system to go to the next page. The third view of the second row illustrates the user interacting with the system as seen through the HMD 12, where the user initiates an action by "pressing" the "N" button and the system performs the associated function by going to Page 2 of the manual (Step S8).

The third row of FIG. 3 illustrates the that the input device 22 can be augmented with menus in addition to buttons. In the first view of the third row, the user places their finger on the first marker which corresponds to the "H" or Help button. Once the AR system determines the user has requested help, the AR system will augment the user's view by inserting a graphic help menu with several help options, as shown in the third view of the third row. In addition, up and down arrows will be placed above the second and third markers during the help mode to assist the user in selecting the help option desired. It is to be understood that the up and down arrows are only augmented in the user's view during the help mode. It is also to be understood that whenever a single marker is activated the remaining two markers can be augmented to reveal other options of the activated marker.

New input devices and interaction methods for augmented reality applications that exploit the recent advances in augmented reality technologies have been described. In particular, for the augmented reality systems that use an infrared video-based tracking system, the interaction/input devices and methods of the present invention provide intuitive, easy-to-use means of interacting with the augmented reality system. The system gives the user visual feedback in forms of augmentation, e.g., menus, to facilitate the interaction.

The input devices of the present invention do not put any additional burden on the running or processing of the augmented reality application since the AR system is already determining locations of markers for tracking purposes. The tracking system intelligently can decide if the user is in the input/interaction mode by determining if the user is looking at the various menu markers in the scene. Furthermore, use of visual feedback assists the user and enhances his/her experience with the augmented reality system greatly.

While the invention has been shown and described with reference to certain preferred embodiments thereof, it will be understood by those skilled in the art that various changes in form and detail may be made therein without departing from the spirit and scope of the invention as defined by the appended claims. For example, the input device can be employed in various types of AR systems, such as optical see-through or video see-through systems. Additionally, the input device of the present invention can be used in conjunction with different types of display devices, e.g., a computer monitor, video-capable mobile phone, personal digital assistant (PDA), etc.

What is claimed is:

1. A system for augmenting a user's view of real-world objects with virtual objects to provide a composite augmented reality image, the system comprising:

a display device for displaying the composite augmented reality image to the user;

a video-based tracking system for locating real-world objects;

a processor for determining the position and orientation of the user's view based on the location of the real-world objects and for projecting the virtual objects onto the display device; and an input device including at least one marker placed at a predetermined location in the real world, wherein the tracking system locates the input device and the processor determines its functionality based on its location, wherein the input device further comprises a plurality of markers, each of the plurality of markers being augmented with different virtual objects, and wherein when one of the plurality of markers is activated the remaining markers are augmented with virtual objects corresponding to options of the activated marker.

2. The system as in claim 1, wherein the video-based tracking system is an infrared video-based tracking system.

3. The system as in claim 2, wherein the infrared video-based tracking system comprises:

a camera for capturing video of the real world, the camera including an infrared-filter lens for capturing light in an infrared frequency; and a plurality of infrared illumination light-emitting diodes (LEDs) for providing the infrared light.

4. The system as in claim 2, wherein the at least one marker of the input device is retroreflective.

5. The system as in claim 2, further comprising a marker board including a plurality of retroreflective markers surrounded by a continuous band of retroreflective material, the marker board being located in the real world at a known location to serve as a point of reference for the infrared video-based tracking system.

6. The system as in claim 1, wherein the at least one marker of the input device is augmented on the display device with a virtual object representing a button.

7. The system as in claim 1, wherein the at least one marker of the input device is augmented on the display device with a virtual object representing a menu of selectable options.

8. In a system for augmenting a users view of real-world objects with virtual objects to provide a composite augmented reality image, the system including a display device for displaying the composite augmented reality image to the user, a video-based tracking system for locating real-world objects, and a processor for determining the position and orientation of the user's view based on the location of the real-world objects and for projecting the virtual objects onto the display device, an input device comprising:

at least one marker placed at a predetermined location in the real world, wherein the tracking system locates the input device and the processor determines its functionality based on its location, further comprising a plurality of markers, each of the plurality of markers being augmented with different virtual objects, and wherein when one of the plurality of markers is activated the remaining markers are augmented with virtual objects corresponding to options of the activated marker.

9. The input device as in claim 8, wherein the video-based tracking system is an infrared video-based tracking system.

10. The input device as in claim 9, wherein the infrared video-based tracking system comprises:

a camera for capturing video of the real world, the camera including an infrared-filter lens for capturing light in an infrared frequency; and a plurality of infrared illumination light-emitting diodes (LEDs) for providing the infrared light.

11. The input device as in claim 9, wherein the at least one marker is retroreflective.

12. The input device as in claim 9, wherein the infrared video-based tracking system comprises a marker board including a plurality of retroreflective markers surrounded by a continuous band of retroreflective material, the marker board being located in the real world at a known location to serve as a point of reference for the infrared video-based tracking system.

13. The input device as in claim 8, wherein the at least one marker is augmented on the display device with a virtual object representing a button.

14. The input device as in claim 8, wherein the at least one marker is augmented on the display device with a virtual object representing a menu of selectable options.

15. In a system for augmenting a user's view of real-world objects with virtual objects to provide a composite augmented reality image, the system including a display device for displaying the composite augmented reality image to the user, a video-based tracking system for locating real-world objects, and a processor for determining the position and orientation of the user's view based on the location of the real-world objects and for projecting the virtual objects onto the display device, a method for interacting with the system comprising the steps of:

providing an input device including at least one marker placed at a predetermined location in the real world;

capturing video of the real world by the video-based tracking system;

analyzing the captured video to determine if the at least one marker is visible;

if the at least one marker is visible, determining the real world location of the at least one marker; and loading the input device's functionality into the system to be available for the user to interact with the system, wherein the loading step further comprises the step of entering an input mode, and further comprising the steps of: determining if the at least one marker is not visible after entering the input mode; and if the at least one marker is not visible, performing a function associated with the at least one marker, wherein the input device comprises a plurality of markers, each of the plurality of markers being augments with different virtual objects, further comprising the step of, when at least one of the markers is activated, augmenting the remaining markers with virtual objects corresponding to options of the activated marker.

16. The method as in claim 15, wherein the video-based tracking system is an infrared video-based tracking system and the at least one marker of the input device is retroreflective.

17. The method as in claim 15, further comprising the step of augmenting the at least one marker of the input device with a virtual object.

18. The method as in claim 15, further comprising the step of augmenting the at least one marker of the input device with a virtual object representing a menu of selectable options.

19. The method as in claim 15, further comprising the step of providing a marker board, the marker board being located at the real world in a known location to serve as a point of reference for the video-based tracking system.

20. A system for augmenting a user's view of real-world objects with virtual objects to provide a composite augmented reality image, the system including a display device for displaying the composite augmented reality image to the user, a video-based tracking system for locating real-world objects, and a processor for determining the position and orientation of the user's view based on the location of the real-world objects and for projecting the virtual objects onto the display device, a method for interacting with the system comprising the steps of:

providing an input device including at least one marker placed at a predetermined location in the real world;

capturing video of the real world by the video-based tracking system;

analyzing the captured video to determine if the at least one marker is visible;

if the at least one marker is visible, determining the real world location of the at least one marker; and loading the input device's functionality into the system to be available for the user to interact with the system, wherein the input device comprises a plurality of markers, each of the plurality of markers being augments with different virtual objects, further comprising the step of, when at least one of the markers is activated, augmenting the remaining markers with virtual objects corresponding to options of the activated marker.

* * * * *